US011334086B2

(12) United States Patent
Wang et al.

(10) Patent No.: US 11,334,086 B2
(45) Date of Patent: May 17, 2022

(54) AUTONOMOUS ROBOTS AND METHODS OF OPERATING THE SAME

(71) Applicant: Intel Corporation, Santa Clara, CA (US)

(72) Inventors: Bin Wang, Beijing (CN); Jianguo Li, Beijing (CN); Shoumeng Yan, Beijing (CN)

(73) Assignee: Intel Corporation, Santa Clara, CA (US)

( * ) Notice: Subject to any disclaimer, the term of this patent is extended or adjusted under 35 U.S.C. 154(b) by 67 days.

(21) Appl. No.: 16/639,702

(22) PCT Filed: Sep. 27, 2017

(86) PCT No.: PCT/CN2017/103623
§ 371 (c)(1),
(2) Date: Feb. 17, 2020

(87) PCT Pub. No.: WO2019/061062
PCT Pub. Date: Apr. 4, 2019

(65) Prior Publication Data
US 2020/0264626 A1   Aug. 20, 2020

(51) Int. Cl.
*G05D 1/02* (2020.01)
*G01C 21/20* (2006.01)
*G05D 1/00* (2006.01)

(52) U.S. Cl.
CPC ......... *G05D 1/0253* (2013.01); *G01C 21/206* (2013.01); *G05D 1/0088* (2013.01); *G05D 1/0238* (2013.01)

(58) Field of Classification Search
CPC .. G05D 1/0253; G05D 1/0088; G05D 1/0238; G05D 1/0246; G05D 1/0274; G05D 1/0217; G05D 2201/0216; G01C 21/206; G01S 17/93
See application file for complete search history.

(56) References Cited

U.S. PATENT DOCUMENTS

2002/0102017 A1* 8/2002 Kim ................... G06K 9/4652
                                                                382/164
2008/0009966 A1* 1/2008 Bruemmer ............ G06N 3/008
                                                                700/245
(Continued)

FOREIGN PATENT DOCUMENTS

CN   103546516   1/2014
CN   104268862   1/2015
(Continued)

OTHER PUBLICATIONS

Kardoss et al., Velocity obstacles for Dubins-like mobile robots, Jul. 2-6, 2017, IEEE, Mediterranean Conference on Control and Automation, pp. 346-351. (Year: 2017).*

(Continued)

*Primary Examiner* — Donald J Wallace
(74) *Attorney, Agent, or Firm* — Hanley, Flight & Zimmerman, LLC

(57) ABSTRACT

Autonomous robots and methods of operating the same are disclosed. An autonomous robot includes a sensor and memory including machine readable instructions. The autonomous robot further includes at least one processor to execute the instructions to generate a velocity costmap associated with an environment in which the robot is located. The processor generates the velocity costmap based on a source image captured by the sensor. The velocity costmap includes velocity information indicative of movement of an obstacle detected in the environment.

23 Claims, 10 Drawing Sheets

(56) References Cited

U.S. PATENT DOCUMENTS

| | | | | |
|---|---|---|---|---|
| 2011/0299770 | A1* | 12/2011 | Vaddadi | G06K 9/6211 |
| | | | | 382/165 |
| 2017/0168488 | A1* | 6/2017 | Wierzynski | G05D 1/0251 |
| 2017/0193830 | A1* | 7/2017 | Fragoso | G05D 1/102 |

FOREIGN PATENT DOCUMENTS

| | | | |
|---|---|---|---|
| CN | 105487535 | | 4/2016 |
| CN | 106680832 | | 5/2017 |
| CN | 106959696 | | 7/2017 |
| KR | 101409323 B1 | * | 7/2014 |
| KR | 20150035101 A | * | 4/2015 |

OTHER PUBLICATIONS

Gong et al., VPH+: An Enhanced Vector Polar Histogram Method for Mobile Robot Obstacle Avoidance, Aug. 5-8, 2007, IEEE, Proceedings of the 2007 IEEE International Conference on Mechatronics and Automation, pp. 2784-2788. (Year: 2007).*

Computer Vision Group, "Scene Flow Estimation," retrieved from "http://vision.in.tum.de/research/sceneflow", Aug. 1, 2017 (4 pages).

ros.org, "costmap_2d Package Summary," retrieved from "http://wiki.ros.org/costmap_2d", Aug. 1, 2017 (10 pages).

Wikipedia, "Mean shift", retrived from "https://en.wikipedia.org/w/index.php title=Mean_shift&oldid=787784661", Aug. 1, 2017, (5 pages).

Vogel et al., "Piecewise Rigid Scene Flow", IEEE International Conference on Computer Visions, Dec. 2013, (8 pages).

International Searching Authority, "International Search Report" issued in connection with PCT application No. PCT/CN2017/103623, dated Jun. 27, 2018, (3 pages).

International Searching Authority, "Written Opinion of The International Searching Authority" issued in connection with PCT application No. PCT/CN2017/103623, dated Jun. 27, 2018, (3 pages).

* cited by examiner

AUTONOMOUS ROBOTS AND METHODS OF OPERATING THE SAME

FIELD OF THE DISCLOSURE

This disclosure relates generally to autonomous robotics, and, more particularly, to autonomous robots and methods of operating the same.

BACKGROUND

For many years, robots have been widely used in factory assembly lines. More recently, advances in robotic technologies have resulted in robotic devices being used in other types of environments including business offices, consumer homes, and so forth. Some robotic devices are capable of moving from one location to a second location autonomously. Such mobile robots employ one or more algorithms based on different sensors including sonars, laser range scanners, and/or depth cameras to avoid colliding into objects within the environment in which the robot is moving.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
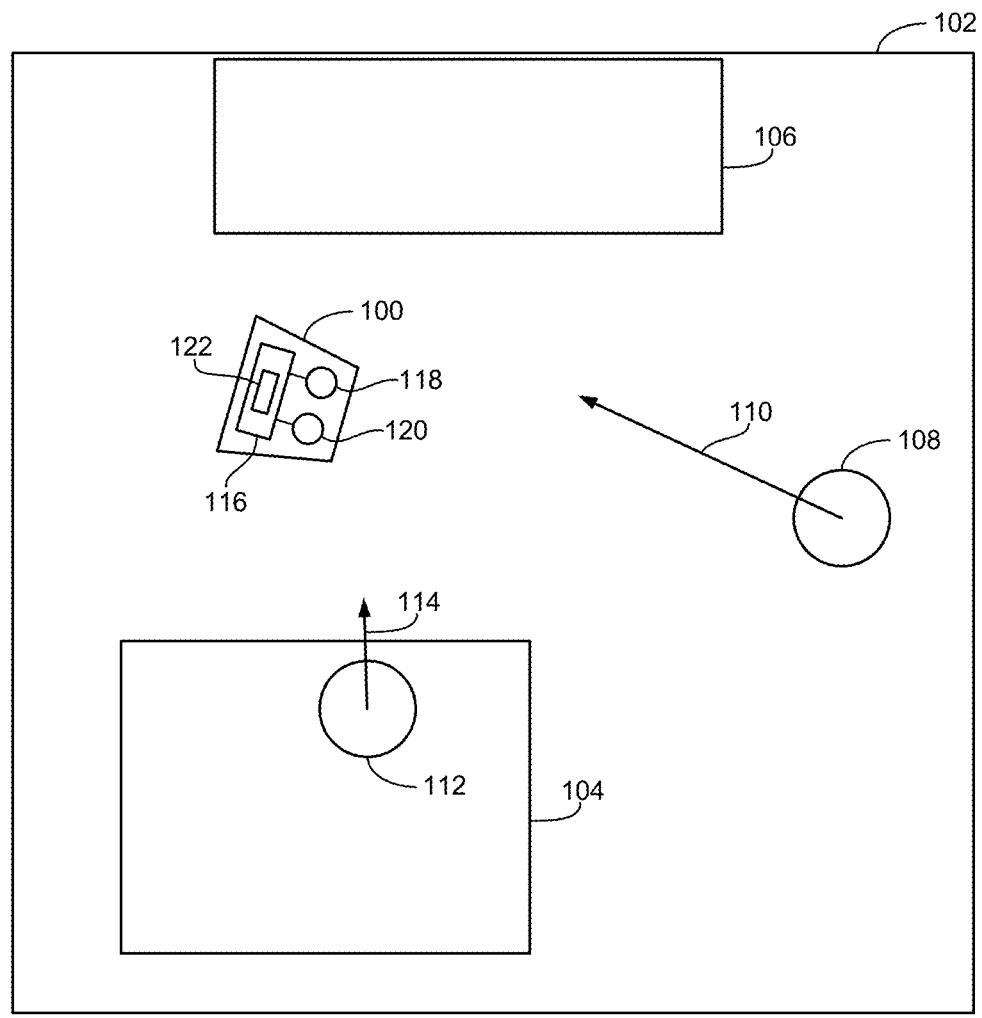
FIG. 1 illustrates an example autonomously mobile robot within an example environment.

There are many different obstacle/collision avoidance algorithms used by robots in conjunction with various types of sensors to enable robots to autonomously move within an environment while avoiding obstacles in the environment. Any type of autonomously mobile robot (e.g., an autonomous vehicle, an unmanned aerial vehicle, a humanoid robot, etc.) may use such collision avoidance algorithms. A commonly employed tool used in connection with such algorithms is a costmap. A costmap is used to define the occupancy state (occupied, free, etc.) of individual cells of an occupancy grid corresponding to the environment in which an autonomously mobile robot is moving. The size of each individual cell and, thus, the granularity of an occupancy grid of a costmap depends upon the resolution of the sensors used to detect objects within the environment. Based on the identification of occupied and free cells within a costmap representative of the surrounding environment, the autonomously mobile robot is able to navigate in the environment and avoid collisions with obstacles. As used herein, an autonomously mobile robot refers to any robotic device that is capable of autonomously moving within an environment based on sensor data. Further, as used herein, autonomous movement includes both movement of a portion of the device (e.g., an arm) anchored to a stationary base and movement of the entire device (e.g., including the base).

The position of obstacles represented within existing costmaps are represented at a static point in time. That is, a typical costmap does not convey whether a detected obstacle is stationary or moving. Rather, the costmap merely conveys where obstacles were located at the time the sensor data was collected that was used to generate the costmap. Typically, autonomously mobile robots that navigate using a costmap regenerate the costmap frequently (e.g., multiple times a second) based on updated sensor data collected in substantially real time. As a result, the movement of obstacles is captured based on the changing location of the obstacle each time a new costmap is generated. While costmaps employed in this manner enable autonomously mobile robots to avoid collisions with stationary obstacles and relatively slow-moving objects, this approach is often insufficient to enable autonomously mobile robots to revise navigation routes for changes in the surrounding environment (particularly, where the changes corresponding to relatively fast-moving objects or obstacles).

Examples disclosed herein enable dynamic collision avoidance for autonomously mobile robots by generating motion-based costmaps that represent the current position of obstacles, their velocity, and their direction of movement relative to the autonomously mobile robots. That is, example robots structured as disclosed herein to operate in an environment containing stationary and/or moving objects are capable of navigating in the environment while avoiding collisions with the objects. Such example robots may avoid collisions without communicating with other objects in the environment by dynamically adjusting a travel path in substantially real-time based on the motion information included in the velocity-based costmaps. Such velocity-based costmaps are referred to herein as velocity costmaps. Including velocity information (including a direction of movement (e.g., trajectory)) significantly increases the processing requirements of a navigation controller potentially reducing the response time of an autonomously mobile robot. Accordingly, to improve efficiency and reduce processing requirements, in some examples, a coarse (e.g., low resolution) velocity costmap based on reduced resolution sensor data is initially generated. The coarse velocity costmap may then be analyzed to identify specific regions within the field of view of the sensors associated with motion (i.e., where moving obstacles are detected). In such examples, the full (high) resolution sensor data corresponding to the identified regions of motion are analyzed to generate a fine (e.g., high resolution) velocity costmap for the relevant regions where movement was detected. This two-stage approach enables the precise tracking of moving obstacles while reducing processing requirements so as to improve the efficiency of the processor making the determination and enable dynamic collision avoidance in substantially real-time. Of course, in some examples, depending on the application, some examples may not need the increased precision provided by the fine velocity costmap. In such examples, dynamic collision avoidance is accomplished simply using the velocity and trajectory information contained in the coarse velocity costmap.

FIG. 1 illustrates an example autonomously mobile robot 100 within an example environment 102. For purposes of explanation, the example environment 102 of FIG. 1 is a room with stationary objects positioned on a floor including a table 104 and a counter or cabinet 106. Further, in the illustrated example, the environment 102 includes two moving objects including a first moving object 108 moving in a first direction 110 and a second moving object 112 moving in a second direction 114. In the illustrated example, the speed or velocity of the first and second objects 108, 112 is represented by the length of the arrows designating the first and second directions 110, 114. Thus, as shown in FIG. 1 by the difference in length of the directional arrows, the first object 108 is moving faster than the second object 112. The arrows 110, 114 may be thought of as vectors representing direction by their orientation and velocity by their magnitude.

In the illustrated example, the autonomously mobile robot 100 includes a control system 116 in communication with one or more optical sensors 118 and one or more motion sensors 120. The optical sensor(s) 118 are used to detect obstacles within the environment 102 surrounding the autonomously mobile robot 100. In some examples, the optical sensor(s) 118 correspond to one or more depth sensors, such as an RGB-D (red-green-blue-depth) camera. An RGB-D camera is capable of capturing an RGB-D image that includes both color and depth information for each pixel of the image. In some examples, the motion sensor(s) 120 correspond to an inertial measurement unit (IMU) that includes one or more accelerometers, gyroscopes, magnetometers, and/or other sensors to measure and report the position, orientation, and/or motion of the autonomously mobile robot 100. In some examples, the robot includes other sensors (e.g., heat sensors).

In the illustrated example, the control system 116 uses sensor data provided by the one or more sensors (e.g., the sensor(s) 118, 120) to autonomously control movement of the autonomously mobile robot 100. In some examples, the control system 116 includes and/or implements a costmap developer 122 to facilitate autonomous navigation of the autonomously mobile robot 100 within the environment 102. More particularly, the costmap developer 122 may generate a velocity costmap of the surrounding environment 102 to reflect the stationary state of the table 104 and the cabinet 106 and to reflect the moving nature of the first and second objects 108, 112. In this manner, the control system 116 implements dynamic collision avoidance with sufficient speed to navigate in environments with obstacles moving relatively fast.

Figure 2:
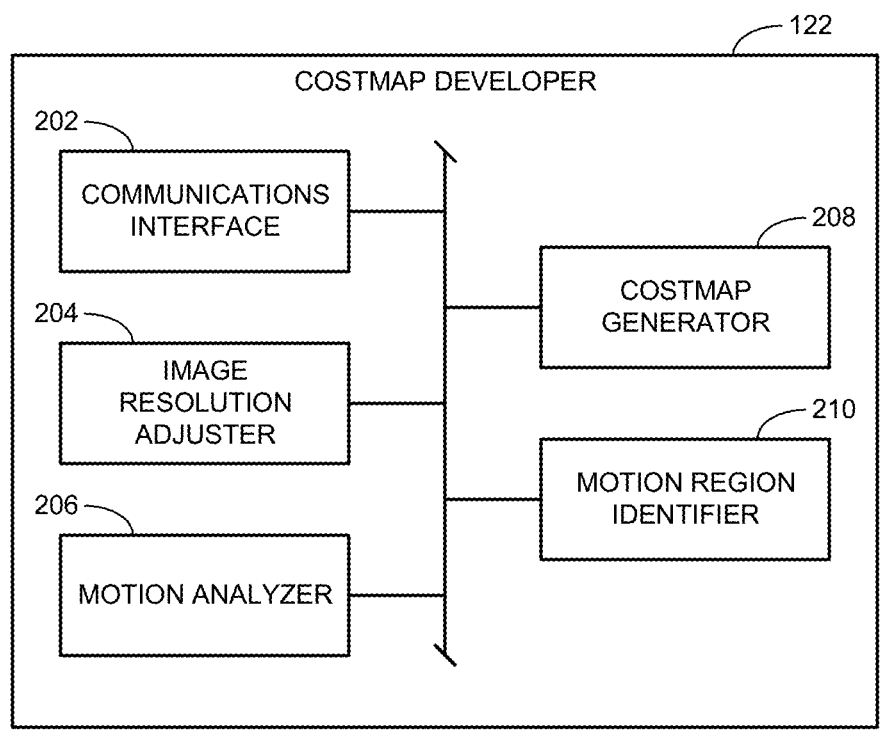
FIG. 2 is a block diagram illustrating an example implementation of the example costmap developer of the example autonomously mobile robot of FIG. 1.

FIG. 2 is a block diagram illustrating an example implementation of the example costmap developer 122 of FIG. 1. As shown in the illustrated example, the costmap developer 122 includes an example communications interface 202, an example image resolution adjuster 204, an example motion analyzer 206, an example costmap generator 208, and an example motion region identifier 210.

In this example implementation, the example costmap developer 122 of FIG. 2 includes the example communications interface 202 to enable communications with other components of the example autonomously mobile robot 100. For example, the communications interface 202 may communicate with the control system 116, the optical sensor(s) 118 and/or the motion sensor(s) 120 to obtain and/or process relevant sensor data.

The example costmap developer 122 of FIG. 2 includes the example image resolution adjuster 204 to adjust the resolution of RGB-D images captured by the optical sensor(s) 118 for analysis in generating a costmap. The granularity and, thus, the precision of a costmap depends upon the resolution of the sensor data upon which the costmap is based. At the highest granularity, each cell within the occupancy grid may correspond to a different pixel of a captured image used to define the costmap. In some examples, the image resolution adjuster 204 reduces the size of a captured image to reduce data for processing. For instance, some examples cause pixelization by combining multiple pixels from the original source image and treating the combined pixels as a single pixel for subsequent analysis. While this reduces the granularity of the resulting costmap, it also increases the speed at which images are analyzed to enable dynamic control of the autonomously mobile robot 100 in substantially real-time while reducing the load on the processor performing the analysis. Other techniques may alternatively be used to reduce the resolution or granularity of the image data to be analyzed. For example, rather than combining pixels, the image resolution adjuster 204 may downsample the image in any other suitable manner. For instance, other examples, extract every other pixel (or pixels at some other spacing) for subsequent analysis. The amount of downsampling may depend upon the particular application and the associated processing speeds needed to implement reliable dynamic collision avoidance. As a particular example, an original RGB-D image used as a source image may have a resolution of 320×240 pixels that is downsampled to a coarse image of 80×60 pixels. While such downsampling may result in reduced detail in the image for relatively distant objects, there is likely to still be sufficient information for relatively close objects to enable dynamic collision avoidance and autonomous navigation (which is primarily concerned with nearby objects).

As described above and detailed further below, in some examples, two separate velocity costmaps, including a coarse velocity costmap and a fine velocity costmap, are generated that differ based on their resolution. In some examples, the fine velocity costmap is generated based on the original resolution of source images captured by the optical sensor(s) 118 and the coarse velocity costmap is generated based on a pixelization (e.g., downsampling) of the source images. In other examples, both the fine and coarse velocity costmaps are generated based on a reduced resolution of the original source image with the coarse velocity costmap associated with a lower resolution than the fine velocity costmap.

Before a velocity costmap can be generated, velocity information (including direction of movement) associated with the surrounding environment 102 needs to be determined. While a single RGB-D image includes both color information and depth information for each pixel, there is no indication of velocity. Accordingly, in the illustrated example, the costmap developer 122 includes the example motion analyzer 206 to analyze a sequence of at least two RGB-D images captured by the optical sensor(s) 118 at successive points in time to generate a three-dimensional (3D) motion field. The process of generating such a 3D motion field may be referred to as scene flow estimation.

Briefly, scene flow estimation involves the comparison of pixels (or groups of pixels) in at least two images. Analyzing every pixel individually may be referred to as dense scene flow. In contrast, analyzing groups of pixels may be referred to a semi-dense scene flow. Changes between pixels in the separate images corresponding to a particular object in the field of view of the optical sensor(s) 118 may be analyzed to determine movement of the particular object. More particularly, the color information of the pixels can be used to determine lateral movement (e.g., movement across the field of view of the optical sensor(s) 118) while the depth information of the pixels can be used to determine depth movement (e.g., movement away from or towards the optical sensor(s) 118). Based on the detected amount (and direction) of movement of an imaged object and the time that elapsed between the separate images, the velocity and direction of movement of the object can be determined. By determining the velocity and direction of movement associated with every pixel (or group of pixels) within an RGB-D image in this manner, the example motion analyzer 312 is able to generate a 3D motion field corresponding to the field of view of the optical sensor(s) 118.

While dense scene flow (analyzing every pixel individually) provides greater precision, reducing the resolution of images (for a semi-dense scene flow estimation) can significantly increase processor efficiency and reduce processing time. Accordingly, in some examples, the motion analyzer 206 generates a first 3D motion field based on the coarse image generated by the image resolution adjuster 204. Thereafter, the example motion analyzer 206 generates a second 3D motion field at a higher resolution (e.g., the full resolution of the source image) for isolated regions of interest in the source image. In some examples, the isolated regions of interest correspond to regions where motion was detected based upon an analysis of the coarse 3D motion field. Such regions are of particular interest because they correspond to obstacles with changing locations that need to be precisely tracked to enable the autonomously mobile robot 100 to adequately perform dynamic collision control.

Errors and/or noise in the 3D motion fields generated by the motion analyzer 206 may arise from non-stable movement of the autonomously mobile robot 100 and/or from errors in the optical sensor(s) 118 (e.g., camera jitter in the sensor(s)). In some examples, the example motion analyzer 206 compensates for movement of the autonomously mobile robot 100 based on motion data from the motion sensor(s) 120 of the autonomously mobile robot 100. Additionally or alternatively, motion of the autonomously mobile robot 100 may be accounted for by sensors monitoring the movement of wheels or other motion actuators on the autonomously mobile robot 100. In some examples, camera jitter may be compensated for by using optical sensor(s) 118 that include an inertial measurement unit (IMU) to monitor the movement (jitter) of the sensor(s). Any residual errors that indicate slight motion for stationary objects may be resolved by filtering out motion that is below a near-static motion threshold (e.g., 1 inch per second).

In the illustrated example of FIG. 2, the costmap developer 122 is provided with the example costmap generator 208 to generate a costmap indicative of obstacles detected in the environment 102 based on, for example, image data collected from the optical sensor(s) 118. In some examples, the costmap generator 208 generates a traditional costmap that is a static representation of the current location of detected obstacles within the environment surrounding the autonomously mobile robot 100 that does not include velocity information. Additionally, the costmap generator 208 may generate velocity costmaps based on the 3D motion fields generated by the motion analyzer 206 to represent both the current location of detected obstacles and the motion (velocity and direction of movement) of such obstacles.

Figure 3:
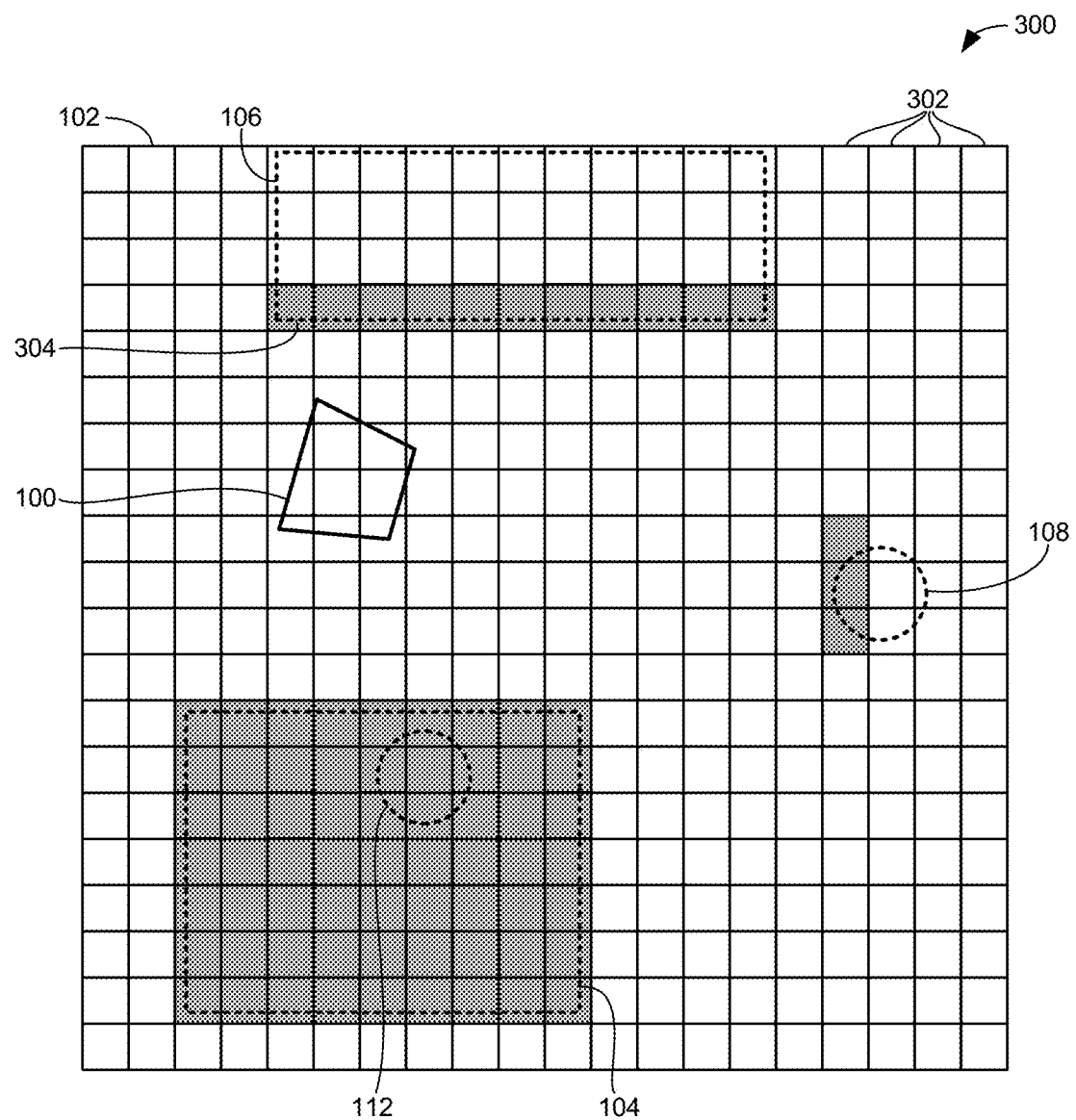
FIG. 3 illustrates an example static costmap generated by the example costmap developer of FIG. 2.

FIG. 3 illustrates an example static costmap 300 that does not include velocity information corresponding to the environment 102 of FIG. 1. Outlines of the table 104, the cabinet 106, and the first and second objects 108, 112 are shown for purposes of explanation but, in some examples, are not included in the costmap generated by the costmap generator 208 because the costmap is generated based on data collected by the sensor(s) 118 such that only the portions of obstacles visible to the sensor(s) 118 would be represented rather than the entire obstacles. In the illustrated example, shaded portions represent the portions of the obstacles detected by the sensor(s) 118 as described more fully below. As shown in the illustrated example, the environment 102 is divided into individual cells 302 corresponding to an occupancy grid of the costmap 300. For purposes of explanation, the granularity of the costmap 300 of FIG. 3 is relatively low (i.e., the size of the individual cells 302 are relatively large). In actual implementation, the size of the individual cells 302 is likely to be much smaller (e.g., corresponding to a single pixel or a small group of pixels (e.g., 2-8 pixels) of an image as described above).

Also, for purposes of explanation, the cells 302 of the occupancy grid are shown in the illustrated example of FIG. 3 to cover the entire environment 102 of FIG. 1. However, inasmuch as individual cells are defined based on corresponding pixels of an image captured by the optical sensor(s) 118, the occupancy grid may be limited to portions of the surrounding environment 102 that are within the field of view of the optical sensor(s) 118. For instance, in the illustrated example of FIG. 3, the shaded cells 302 represent cells that are identified by the costmap generator 208 as being occupied (e.g., an obstacle is detected within the cell) whereas the unshaded cells 302 represent areas where either no obstacle is detected (e.g., it is a free space) or the occupancy state of the cell is unknown. In the illustrated example, it is assumed that the optical sensor(s) 118 of the autonomously mobile robot 100 is lower than a top surface of the cabinet 106. As a result, only the front face 304 of the cabinet 106 is within the field of view of the optical sensor(s) 118. Therefore, in the costmap 300 of FIG. 3, only the cells 302 associated with the location of the front face 304 of the cabinet 106 are designated as being occupied with shading. The area behind the front face 304 of the cabinet 106 is not within the field of view of the optical sensor(s) 118 such that the corresponding cells 302 shown in FIG. 3 behind the front face 304 may not be included in some example costmaps. For the same reason, in the illustrated example, only the cells 302 associated with the first object 108 in direct line of sight with the autonomously mobile robot 100 are shaded to indicate the location of an obstacle within the example costmap 300.

In contrast to the cabinet 106 and the first object 108, where only the cells 302 associated with the portion of the cabinet 106 or first object 108 within the field of view of the optical sensor(s) 118 are shaded, the cells 302 associated with the entire table 104 and the second object 112 are shaded in FIG. 3. In this example, this distinction arises from the fact that whether the optical sensor(s) 118 are positioned above or below the surface of the table 104, the table is still within the field of view of the sensor(s) (e.g., from above or below the table surface). That is, even where the optical sensor(s) 118 are below the surface of the table, the sensor(s) will still be able to detect the underside of the table 104 (e.g., through the table legs; were the table to include a table cloth dropping to the floor, this would not be true and the example would parallel the cabinet 106 where only the front surface is visible). In the illustrated example, as with the first object 108, the portion of the second object 112 furthest away from the autonomously mobile robot 100 is not within the field of view of the optical sensor(s) 118. However, the cells 302 associated with that portion of the second object 112 are nevertheless shaded because the table 104, which is within the field of view of the optical sensor(s) 118, cross over the same space. That is, in the illustrated example, the cells 302 of the costmap 300 correspond to vertical columns within the environment 102. If an obstacle is detected at any height within the column, the associated cell of the costmap 300 is designated as being occupied even if there are other heights within the column that correspond to empty space. Putting it another way, the costmap 300 of this example is a two-dimensional (2D) planar projection of obstacles detected within three-dimensional (3D) space.

Costmaps may be defined in a 2D plane, as shown in FIG. 3, to reduce the amount of processing by the autonomously mobile robot 100 to navigate around such obstacles. However, in some examples, the costmap generator 208 may generate a 3D costmap that preserves elevation information. In some such examples, cells 302 associated with the second object 112 (at the height of the second object 112) would appear similar to those associated with the first object 108 shown in FIG. 3 if the portion of the second object 112 furthest away from the autonomously mobile robot 100 is not in direct line of sight of the optical sensor(s) 118.

While the occupancy state (e.g., occupied or free) of each cell 302 in the illustrated example of FIG. 3 is represented via shading, the costmap generator 208 may designate the occupancy state of each cell by assigning a cost value to each cell (or each pixel or group of pixels associated with each cell). In some examples, the cost value may be binary (e.g., 0 or 1) to indicate whether the cell is occupied or free. In other examples, the cost value may be on a scale to indicate a level of confidence or probability whether a particular cell is occupied or free.

Figure 4:
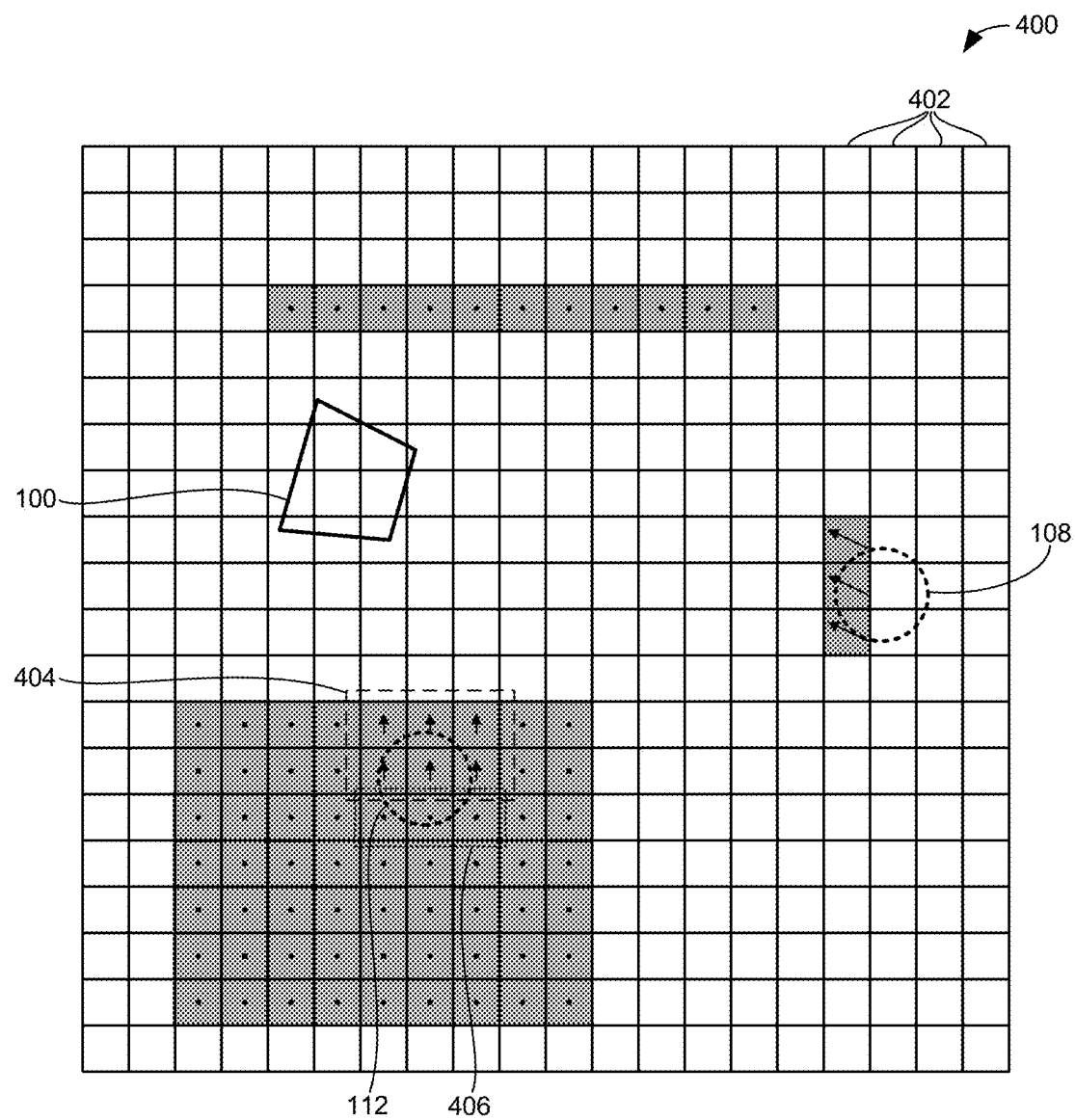
FIG. 4 illustrates an example coarse velocity costmap generated by the example costmap developer of FIG. 2.

FIG. 4 illustrates an example velocity costmap 400 corresponding to the environment 102 of FIG. 1. The velocity costmap 400 of FIG. 4 includes cells 402 that correspond to the cells 302 of the static costmap 300 of FIG. 3. As with FIG. 3, in the illustrated example of FIG. 4, the shaded cells 402 represent cells that are identified by the costmap generator 208 as being occupied (e.g., an obstacle is detected within the cell) whereas the unshaded cells 402 represent areas where either no obstacle is detected (e.g., it is a free space) or the occupancy state of the cell is unknown.

While the same cells are shaded in both FIGS. 3 and 4, the example velocity costmap 400 of FIG. 4 includes additional information indicative of the velocity and direction of movement of the obstacles detected within the shaded cells 402. For purposes of explanation, the cells 402 associated with obstacles that are not moving are identified with a dot while the cells 402 associated with a moving object include an arrow defining the magnitude of the velocity and the direction of movement. In the illustrated example, the magnitude of the velocity of the movement is represented by the length of the arrow. Thus, as shown in FIG. 4, the arrows associated with the first object 108 are longer than the arrows associated with the second object 112 because the first object 108 is moving at a faster speed than the second object 112.

In some examples, the costmap generator 208 of the illustrated example defines the velocity for each cell 402 by assigning a velocity vector to each cell. Each cell is associated with a pixel or group of pixels. Each velocity vector includes three values corresponding to the velocity (e.g., magnitude of movement in a given time period) along each of the X, Y, and Z directions of 3D space. In some examples, where the velocity costmap 400 is projected into a 2D plane, the velocity vector is defined by two values corresponding to the X and Y directions in the plane of the velocity costmap.

As mentioned above, for a 2D velocity costmap, each cell 402 may be conceptualized as a vertical column that may include obstacles at certain heights and free space at other heights. In a similar manner, a particular column may include obstacles at different heights that are moving at different speeds. In some such examples, the velocity vector assigned to the cell is defined by the fastest moving obstacle within the associated column of the cell in a direction towards the autonomously mobile robot 100. Thus, as shown in the illustrated example, the cells 402 of the velocity costmap 400 associated with the portion of the second object 112 nearest the autonomously mobile robot 100 (enclosed by the box identified by reference numeral 404) are designated as including an object moving towards the autonomously mobile robot 100 even though the stationary table 104 extends into the space defined by the corresponding cells. The cells 402 associated with the portion of the second object 112 furthest from the autonomously mobile robot 100 (enclosed by the box identified by reference numeral 406) are designated as not moving (even though the second object is located therein) because that portion of the second object 112 is not within the field of view of the optical sensor(s) 118 such that the stationary table 104 is the only obstacle detected in those cells.

In contrast to the illustrated example, if the second object 112 was moving away from the autonomously mobile robot 100, the costmap generator 208 may designate all cells 402 in which the second object 112 is located as not moving based on the stationary state of the table 104. In such an example, the non-motion of the table 104 takes precedent over the second object 112 because the second object 112 has a negative velocity relative to (i.e., is moving away from) the autonomously mobile robot 100. That is, the table 104 is the fastest moving obstacle in the direction towards the autonomously mobile robot 100 (even though its movement is zero, zero is greater than a negative value) within the columns of the associated cells 402 because the second object 112 has a negative velocity and the table 104 is stationary. In some examples, there may be obstacles moving at different speeds within a column associated with a particular cell. In some such examples, the costmap generator 208 assigns the velocity for the particular cell based on the obstacle moving the fastest towards a navigation path or projected route of the autonomously mobile robot 100. The 2D approach may result in odd behavior. For example, if an unmanned aerial vehicle (UAV) is hovering near the ceiling above the floor, the column it occupies will be indicated as occupied in the costmap and a ground-based robot will serve and/or move in a path to avoid those columns even though there is no risk of collision.

To avoid such results, in some examples, the costmap generator 208 generates a 3D velocity costmap to represent the motion (or lack thereof) of obstacles at their respective heights within 3D space. In such examples, there is no need to determine which obstacles in a same column are moving faster relative to other obstacles, as described above, because all obstacles within the field of view of the optical sensor(s) 118, and their associated motion, are separately identified and represented in the 3D velocity costmap.

Returning to FIG. 2, the example costmap developer 122 includes the example motion region identifier 210 to identify regions of motion within the velocity costmap 400 for further analysis. In some examples, the additional velocity information included in the velocity costmap 400 relative to traditional static costmaps (e.g., the costmap 300 of FIG. 3) can significantly reduce the speed at which the velocity costmap 400 can be processed. Accordingly, in some examples, the costmap generator 208 generates an initial coarse velocity costmap that is based on an RGB-D image captured by the optical sensor(s) 118 that has a resolution reduced from the original source image by the image resolution adjuster 204. This reduction of the resolution can significantly increase the efficiency of a processor executing the costmap developer 122 by reducing the processing cycles needed to execute the costmap analysis.

Once the costmap generator 208 generates a coarse velocity costmap 400, based on a reduced resolution image, the example motion region identifier 210 parses the coarse velocity costmap 400 into near-static regions and motion regions. The near-static regions correspond to cells 402 within the velocity costmap 400 associated with no or little detected movement. In some examples, such cells are identified based on the velocity vectors of the cells indicating a velocity that is below a near-static motion threshold (e.g., 1 inch per second). This threshold serves to filter out potential errors introduced by residual effects in compensating for movement of the autonomously mobile robot 100 and/or jitter in the optical sensor(s) 118. The motion regions identified by the motion region identifier 210 correspond to cells 402 within the velocity costmap 400 that have velocity vectors indicative of movement above the near-static motion threshold.

Figure 5:
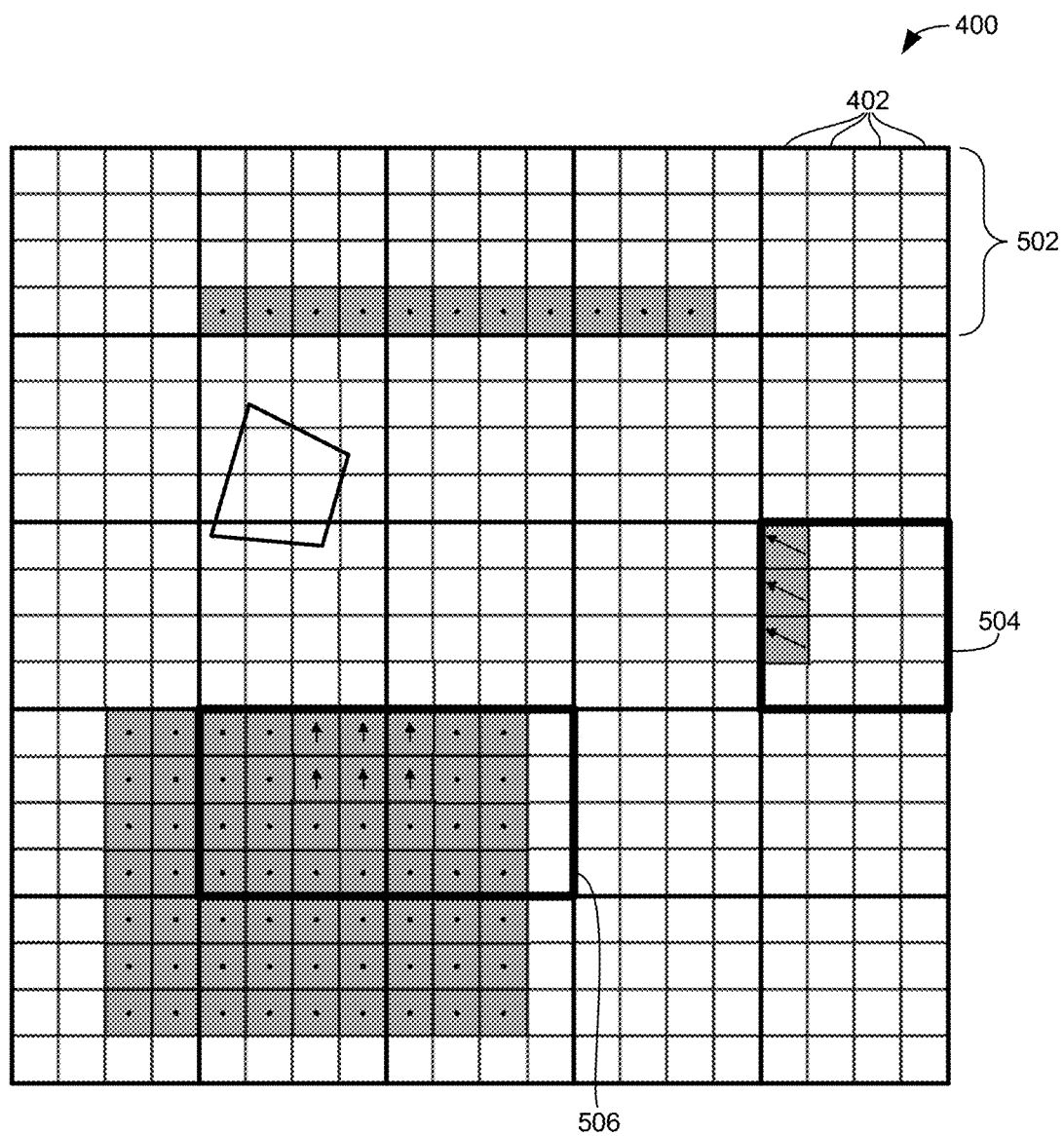
FIG. 5 illustrates the example coarse velocity costmap of FIG. 4 divided into blocks.

In some examples, to isolate the motion regions from near-static regions, the motion region identifier 210 divides the velocity costmap 400 into multiple blocks 502 as shown in FIG. 5, where each block 502 includes multiple individual cells 402. In some examples, the motion region identifier 210 may automatically designate certain blocks 502 in the costmap 400 as the near-static regions based on depth information associated with the cells 402 in the block 502. In particular, the optical sensor(s) 118 may have physical limitations on the distances (or depths) at which objects within an image can be captured in focus. Such distances typically fall within a range between a proximate depth threshold and a remote depth threshold corresponding to the depth of field or focus range of the optical sensor(s) 118. Image data associated with objects outside of this range will be out of focus and, therefore, the velocity vectors generated based on the scene flow estimation of such image data may be unreliable. Accordingly, to avoid errors in subsequent processing, the motion region identifier 210 of this example automatically assigns or designates blocks 502 to the near-static regions regardless of the associated velocity information of the cells included therein when such cells have depth information falling outside the range between the proximate and remote depth thresholds. In some examples, the proximate and remote depth thresholds may be defined to correspond to a range that is less than and within the full focus range of the optical sensor(s) 118 depending upon the particular application of the teachings disclosed herein. For example, if circumstances are such that the movement of objects more than ten feet away from the autonomously mobile robot 100 are unlikely to affect the navigation of the robot, the motion region identifier 210 may automatically assign any block 502 containing cells 402 with depth information of more than ten feet to the near-static regions regardless of the associated velocity information.

In some examples, the motion region identifier 210 clusters multiple adjacent blocks 502 into a single bounded region when the velocity and depth information for the separate blocks 502 are substantially similar (e.g., less than 5% variability). Such blocks 502 are clustered together based on the assumption that blocks 502 associated with detected obstacles that have similar position and velocity information are likely to correspond to the same object that is moving as a unit. This assumption is not represented in FIG. 5 because the relatively large size of the individual cells 402 provided for purposes of illustration. In some examples, where each cell 402 corresponds to a small grouping of pixels, each block 502 is likely to correspond to a relatively isolated area. Furthermore, relatively large blocks 502, as shown in the illustrated example, are not problematic as they merely result in larger motion regions to reduce the likelihood of inadvertently excluding areas of motion in the higher resolution analysis described more fully below.

In some examples, the motion region identifier 210 clusters the blocks by applying a mean shift analysis to each block 502 to identify the maximum velocity and depth information in each block 502. The maximum velocity and depth information from adjacent blocks 502 are compared and the blocks are combined into clusters if the variability is below a threshold (e.g., 5%) to identify or define the final motion regions to be subsequently processed. Thus, in the illustrated example, a first bounded motion region 504 associated with the first object 108 of FIG. 1 includes a single block 502. By contrast, a second bounded motion region 506 associated with the second object 112 of FIG. 1 includes two blocks 502. In some examples, in addition to velocity and depth information, the gray scale intensity may also be used as a feature input to the mean shift clustering analysis.

In the illustrated example, the motion region identifier 210 projects the bounded motion regions 504, 506 back to a higher resolution version of the RGB-D image captured by the optical sensor(s) 118 than was used to generate the coarse velocity costmap 400 of FIG. 4. In some examples, the higher resolution version of the RGB-D image corresponds to the full resolution of the originally captured RGB-D image. In other examples, the higher resolution version may still be downsampled relative to the original source image but have a higher resolution than the coarse image used to generate the coarse costmap 400 of FIG. 4.

Figure 6:
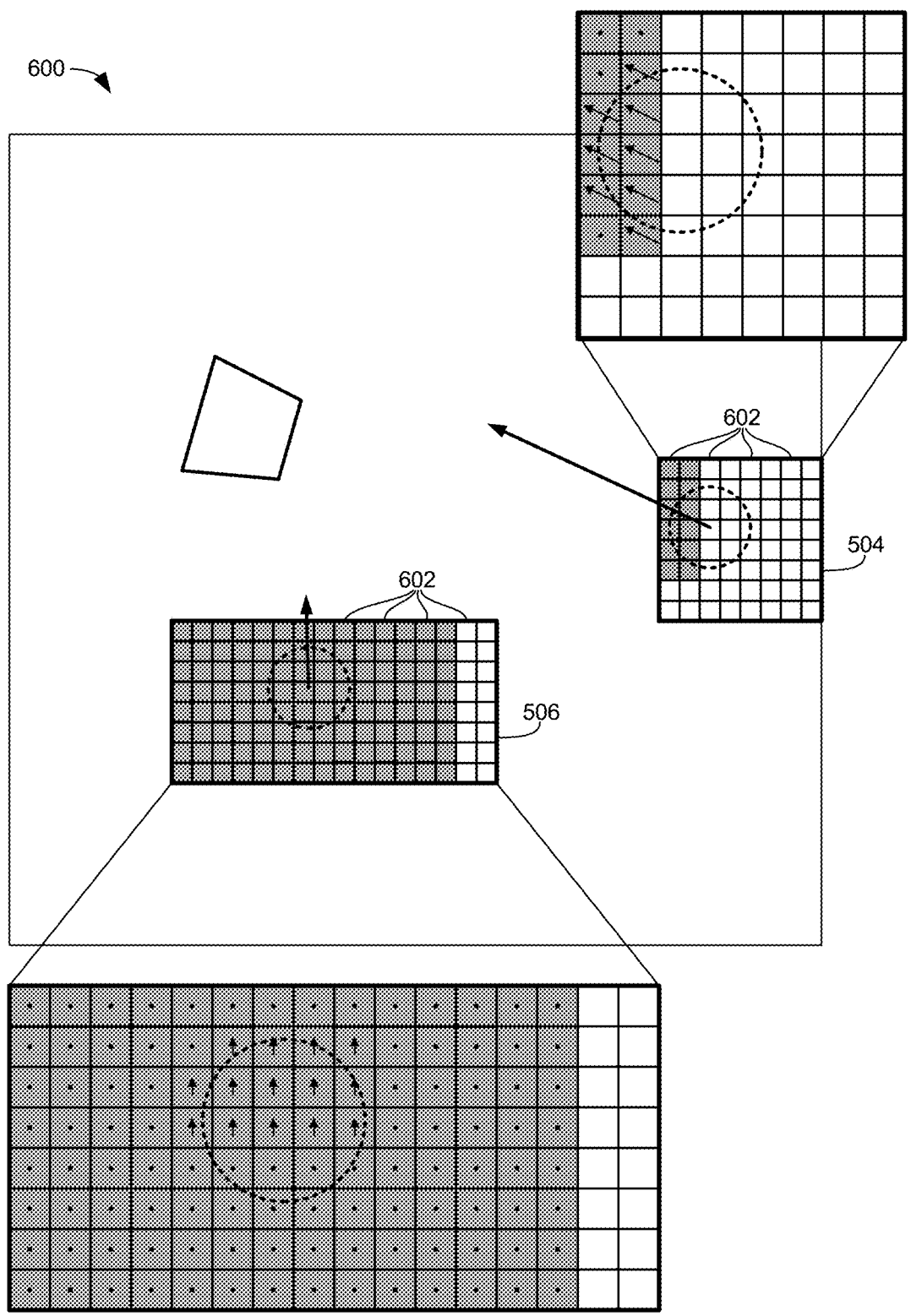
FIG. 6 illustrates an example fine velocity costmap generated by the example costmap developer of FIG. 2.
Figure 7:
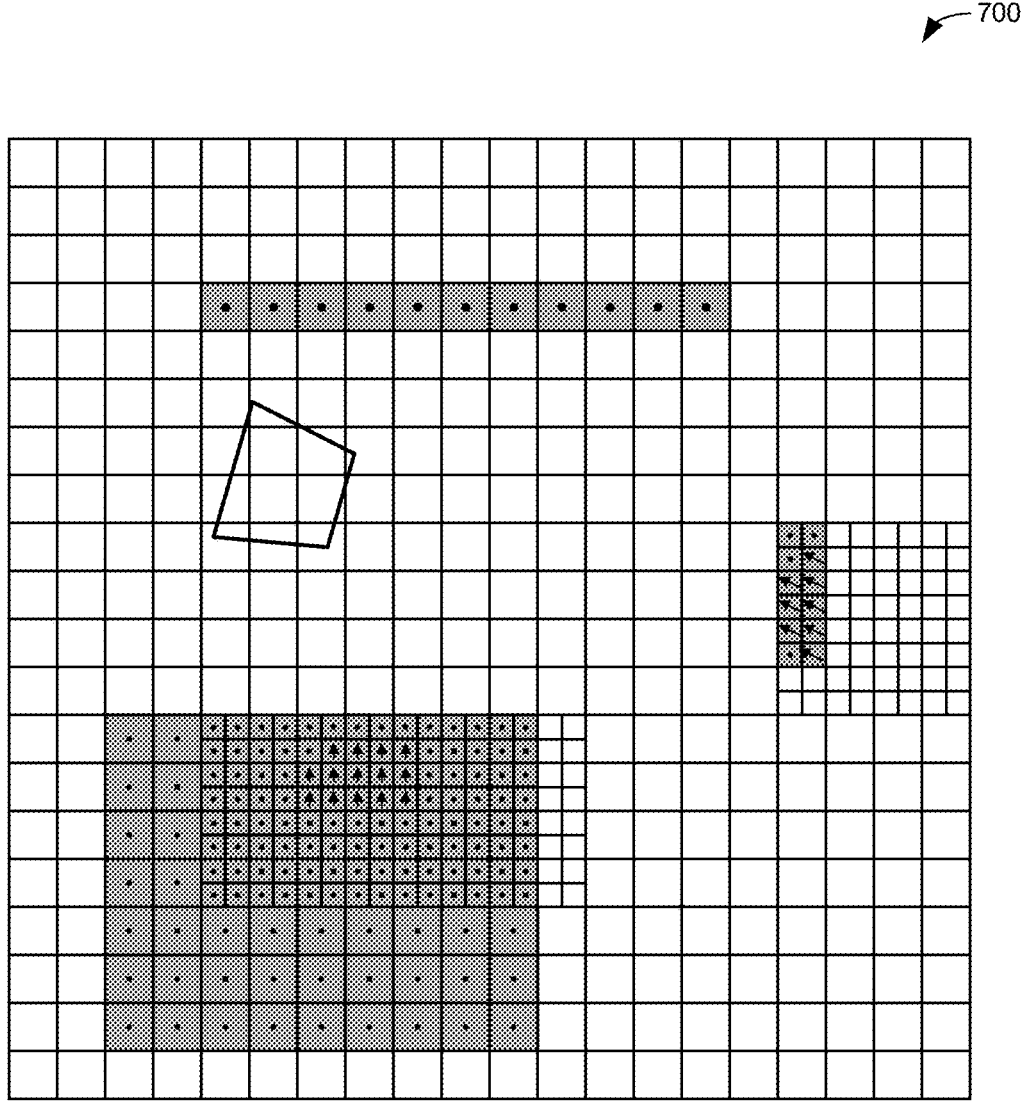
FIG. 7 illustrates an example final velocity costmap generated by the example costmap developer of FIG. 2 that combines the coarse velocity costmap of FIG. 4 with the fine velocity costmap of FIG. 6.

Once the bounded motion regions 504, 506 are projected back to the higher resolution version of the RGB-D image, the identified regions are provided to the motion analyzer 206 to generate a second 3D motion field based on a higher resolution image than what was initially used to generate the coarse velocity costmap 400 of FIG. 4. The motion analyzer 206 may generate this second 3D motion field using scene flow estimation in the same manner as described above except that the granularity (e.g., resolution) is finer and only the portions of the higher resolution image corresponding to the bounded motion regions 504, 506 are analyzed. In some examples, the higher resolution image is cropped to individual ones of the motion regions 504, 506 and the motion analyzer 206 implements a scene flow estimation for the cropped image associated with each motion region 504, 506. Subsequently, the costmap generator 208 may generate a fine (high resolution) velocity costmap based on the second 3D motion field that is limited to the identified motion regions 504, 506 as shown in FIG. 6. In some examples, the fine velocity costmap may be generated in a piecemeal fashion with a separate costmap being generated for each individual motion region 504, 506.

FIG. 6 illustrates an example fine velocity costmap 600 that includes occupancy data and velocity information for cells 602 within the motion regions 504, 506. As shown in the illustrated example, the individual cells 602 of the fine velocity costmap 600 are smaller than the cells 402 in the coarse velocity costmap 400 of FIG. 4 to represent the higher resolution of the costmap 600 of FIG. 6. Analyzing images at higher resolution typically involves increased processing cycles and/or a reduction in the speed or efficiency of the system. However, in this example, processing speeds and/or processor efficiency is enhanced without sacrificing resolution by limiting the analysis to only the motion regions 504, 506 identified by the motion region identifier 210. The other regions (near-static regions) do not need to undergo a high precision analysis because the coarse velocity costmap 400 of FIG. 4 indicates that there are no moving obstacles detected for which more detailed information is needed to enable the autonomously mobile robot 100 to adequately navigate in the environment and implement dynamic collision avoidance in substantially real-time. That is, the initial coarse velocity costmap provides a global analysis of the environment 102 that is accomplished in an efficient manner because it is based on a reduced resolution image of the environment. Following this global analysis, a second fine velocity costmap 600 enables the local analysis of relevant regions in the environment 102 associated with detected movement for a more refined analysis of significant regions of interest to enable a substantially real-time response to such movement.

In some examples, the costmap generator 208 generates the fine velocity costmap 600 based on a piecewise rigid model of the fine 3D motion field generated for the isolated motion regions 504, 506. In particular, the costmap generator 208 segments the motion regions 504, 506 into a collection of piecewise planar regions that are assumed to move with rigid motion. In such examples, every pixel associated with a particular rigid planar region is assumed to share the same motion. Based on these assumptions, a 3D motion model for the object(s) detected within the motion regions 504, 506 may be created. Formulating a 3D model in this manner reduces (e.g., minimizes) the energy function of the scene flow estimation performed by the motion analyzer 206, thereby improving the accuracy of the fine velocity costmap 600.

In some examples, the costmap generator 208 may combine the coarse velocity costmap 400 of FIG. 4 and the fine velocity costmap 600 of FIG. 6 to form a final velocity costmap (such as the costmap 700 shown in FIG. 7) that fully defines the circumstances of the surrounding environment 102. Using the final velocity costmap 700, the autonomously mobile robot 100 is able to determine the location of all obstacles within the surrounding environment as well as the velocity of those obstacles that are moving. Although the velocity costmaps 400, 600, 700 of FIGS. 4-7 are shown and described as being in a 2D plane, a similar methodology may be applied to generate 3D velocity costmaps.

While an example manner of implementing the costmap developer 122 of FIG. 1 is illustrated in FIG. 2, one or more of the elements, processes and/or devices illustrated in FIG. 2 may be combined, divided, re-arranged, omitted, eliminated and/or implemented in any other way. Further, the example communications interface 202, the example image resolution adjuster 204, the example motion analyzer 206, the example costmap generator 208, the example motion region identifier 210, and/or, more generally, the example costmap developer 122 may be implemented by hardware, software, firmware and/or any combination of hardware, software and/or firmware. Thus, for example, any of the example communications interface 202, the example image resolution adjuster 204, the example motion analyzer 206, the example costmap generator 208, the example motion region identifier 210, and/or the example costmap developer 122 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communications interface 202, the example image resolution adjuster 204, the example motion analyzer 206, the example costmap generator 208, and/or the example motion region identifier 210 is/are hereby expressly defined to include a non-transitory computer readable storage device or storage disk such as a memory, a digital versatile disk (DVD), a compact disk (CD), a Blu-ray disk, etc. including the software and/or firmware. Further still, the example costmap developer 122 of FIG. 1 may include one or more elements, processes and/or devices in addition to, or instead of, those illustrated in FIG. 2, and/or may include more than one of any or all of the illustrated elements, processes and devices.

Figure 8:
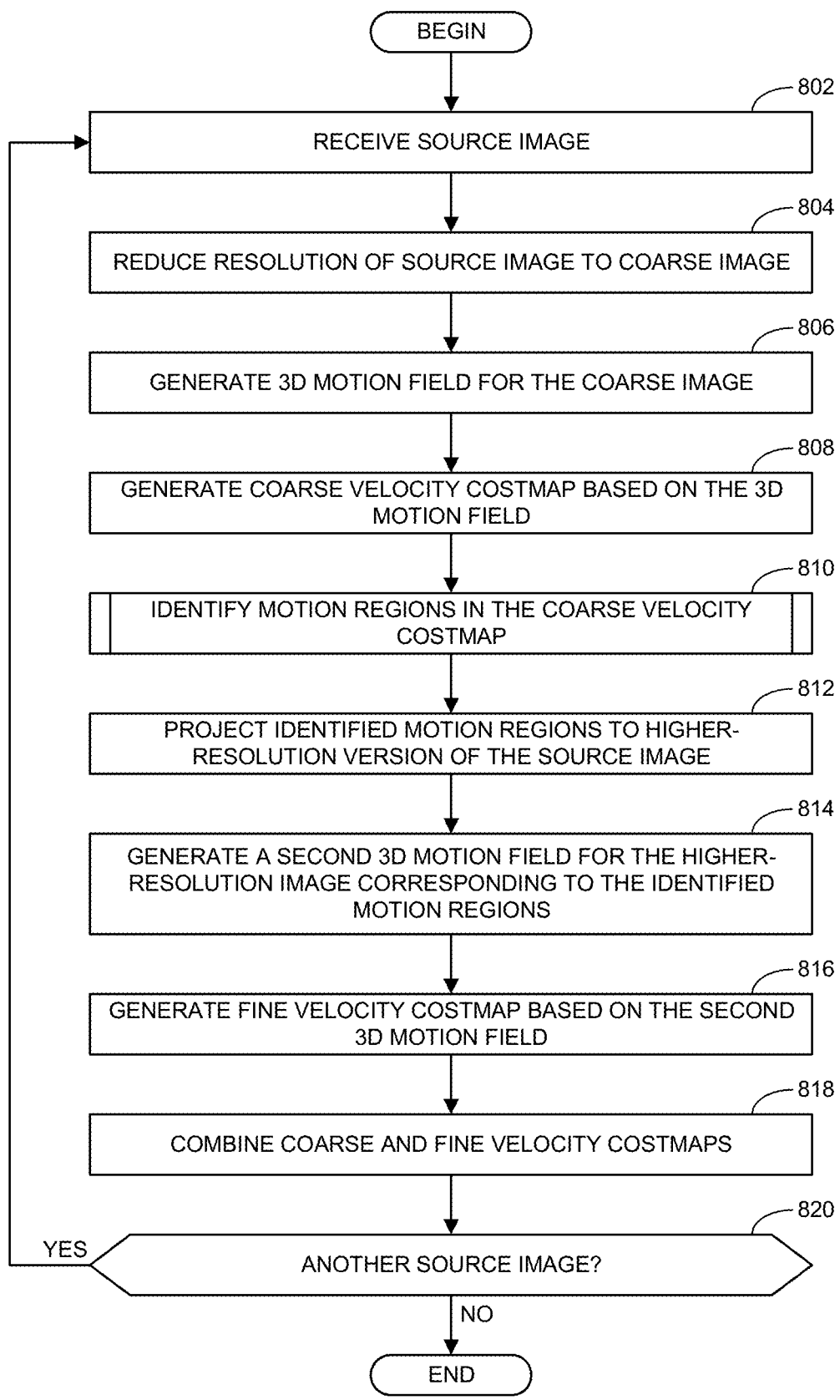
FIGS. 8 and 9 are flowcharts representative of example machine readable instructions that may be executed to implement the example costmap developer of FIG. 2 and/or, more generally, the autonomously mobile robot of FIG. 1.
Figure 9:
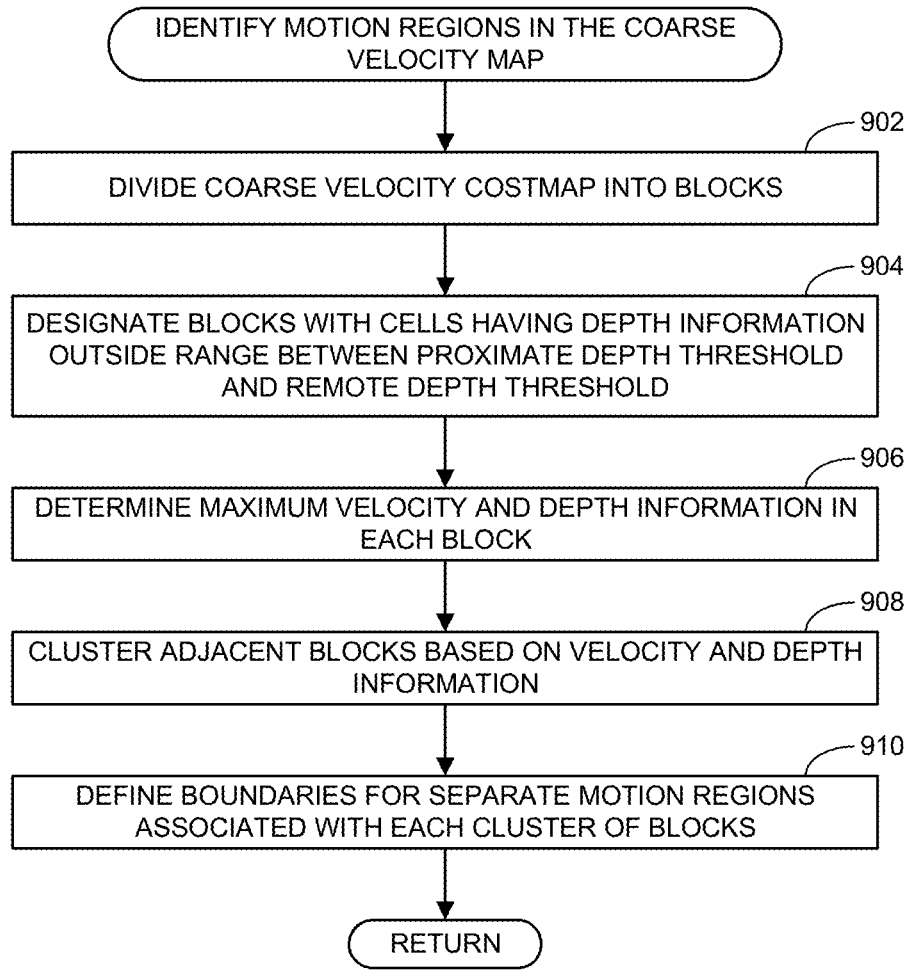

A flowchart representative of example machine readable instructions for implementing the costmap developer 122 of FIG. 2 is shown in FIGS. 8 and 9. In this example, the machine readable instructions comprise a program for execution by a processor such as the processor 1012 shown in the example processor platform 1000 discussed below in connection with FIG. 10. The program may be embodied in software stored on a non-transitory computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 8 and 9, many other methods of implementing the example costmap developer 122 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, hardware processing logic, etc.) structured to perform the corresponding operation without executing software or firmware.

As mentioned above, the example processes of FIGS. 8 and 9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

The instructions of FIG. 8 begin at block 802 where the example communications interface 202 receives a source image. In the illustrated examples, the source image is an RGB-D image with both color information and depth information provided for each pixel. At block 804, the example image resolution adjuster 204 reduces the resolution of the source image to a coarse image. At block 806, the example motion analyzer 206 generates a 3D motion field for the coarse image. As described above, a 3D motion field depends on the comparison of at least two images. Accordingly, in some examples, the 3D motion field for the coarse image is based on the coarse image and a previously captured source image that was reduced to a coarse image in a previous iteration of the example program of FIG. 8.

At block 808, the example costmap generator 208 generates a coarse velocity costmap (e.g., the coarse velocity costmap 400 of FIG. 4) based on the 3D motion field. At block 810, the example motion region identifier 210 identifies motion regions (e.g., the motion regions 504, 506 of FIG. 5) in the coarse velocity costmap 400. Additional detail regarding the implementation of block 810 is provided below in connection with FIG. 9.

At block 812, the example motion region identifier 210 projects the identified motions regions 504, 506 to a higher-resolution version of the source image. At block 814, the example motion analyzer 206 generates a second 3D motion field for the higher-resolution image corresponding to the identified motions regions 504, 506. At block 816, the example costmap generator 208 generates a fine velocity costmap (e.g., the fine velocity costmap 600 of FIG. 6) based on the second 3D motion field. At block 818, the example costmap generator 208 combines the coarse velocity costmap 400 and the fine velocity costmap 600.

At block 820, the example communications interface 202 determines whether there is another source image. If so, control returns to block 202. Otherwise, the example program of FIG. 8 ends. In some examples, the program of FIG. 8 is repeated multiple times a second (e.g., 150 times per second) to enable substantially real-time monitoring of movement in the environment surrounding the autonomously mobile robot 100 in which the costmap developer 122 is implemented.

FIG. 9 is a flowchart representative example machine readable instructions that may be executed to implement block 810 of FIG. 8. The example program of FIG. 9 begins at block 902 where the example motion region identifier 210 divides the coarse velocity costmap 400 into blocks (e.g., the blocks 502 of FIG. 5). At block 904, the example motion region identifier 210 designates the blocks 502 with cells having depth information outside a range between a proximate depth threshold and a remote depth threshold. At block 906, the example motion region identifier 210 determines the maximum velocity and depth information in each block 502. At block 908, the example motion region identifier 210 clusters the blocks 502 based on the velocity and depth information. At block 910, the example motion region identifier 210 defines boundaries for separate motion regions (e.g., the motion regions 504, 506 of FIG. 5) associated with each cluster of blocks 502. Thereafter, the example program of FIG. 9 ands and returns to complete the process of FIG. 8.

Figure 10:
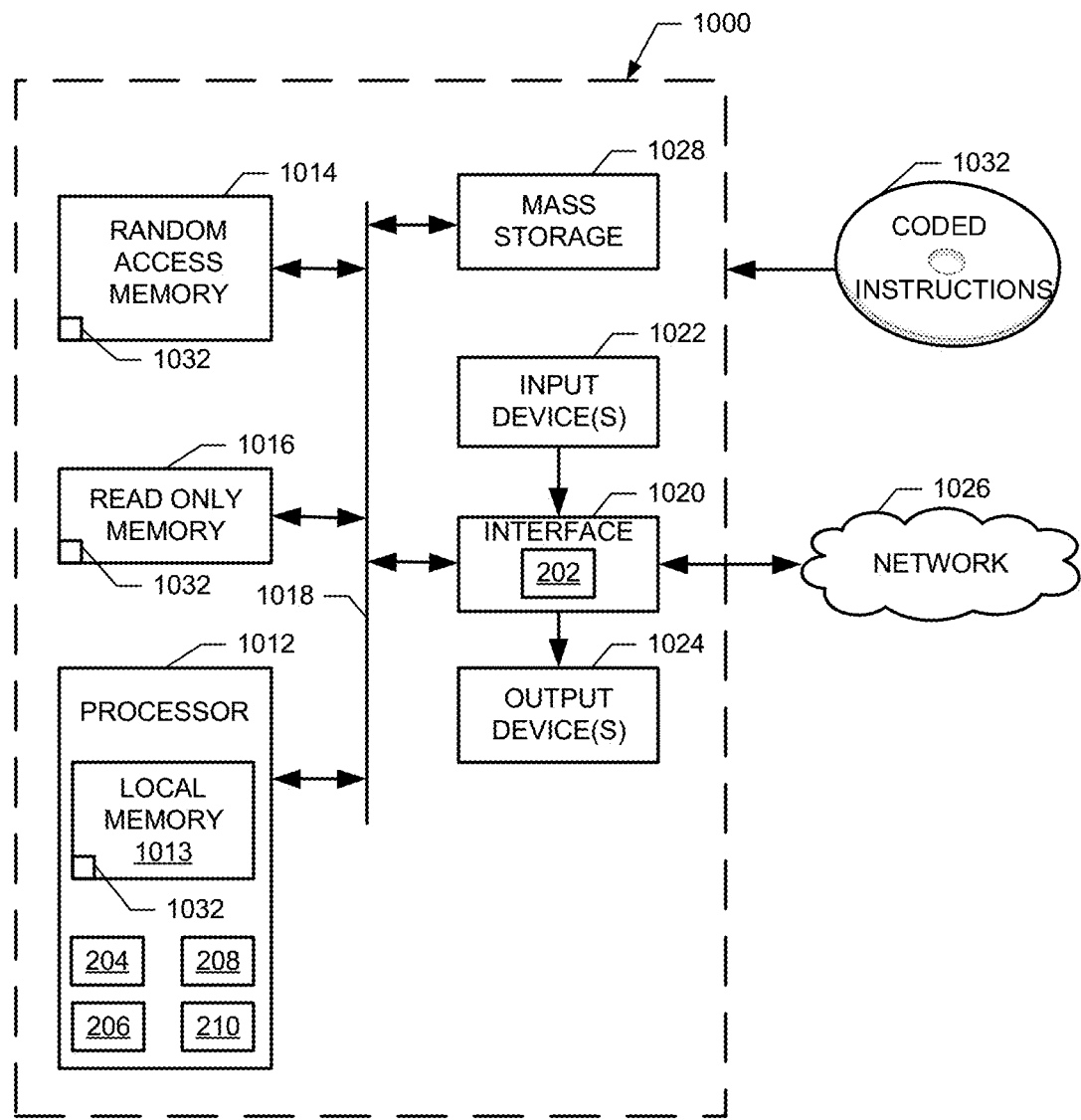
FIG. 10 is a block diagram of an example processor platform structured to execute the example machine readable instructions of FIGS. 8 and/or 9 to implement the example costmap developer of FIG. 2 and/or, more generally, the autonomously mobile robot of FIG. 1.

FIG. 10 is a block diagram of an example processor platform 1000 structured to execute the instructions of FIGS. 8 and 9 to implement the costmap developer 122 of FIG. 1 and/or FIG. 2. The processor platform 1000 can be, for example, a server, a personal computer, a robot, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer. The hardware processor may be a semiconductor based (e.g., silicon based) device. In this example, the processor implements the example image resolution adjuster 204, the example motion analyzer 206, the example costmap generator 208, and the example motion region identifier 210.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.). In this example, the interface circuit 1020 implements the example communications interface 202.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives.

The coded instructions 1032 of FIGS. 8 and 9 may be stored in the mass storage device 1028, in the volatile memory 1014, in the non-volatile memory 1016, and/or on a removable tangible computer readable storage medium such as a CD or DVD.

From the foregoing, it will be appreciated that example methods, apparatus and articles of manufacture have been disclosed that enable the processing of velocity information for dynamic collision avoidance of autonomously mobile robots in substantially real-time. Some such examples implement a two-stage analysis of captured image data to significantly increase processing efficiency while still providing relatively high precision of velocity information associated with moving obstacles. In some examples, the two-stage approach includes an initial global analysis of image data using a coarse (relatively low resolution) image followed by a localized analysis of the image data using a fine (higher resolution) image.

Example 1 is an autonomous robot that includes a sensor and memory including machine readable instructions. The autonomous robot further includes at least one processor to execute the instructions to generate a velocity costmap associated with an environment in which the robot is located. The processor to generate the velocity costmap based on a source image captured by the sensor. The velocity costmap including velocity information indicative of movement of an obstacle detected in the environment.

Example 2 includes the subject matter of Example 1, wherein the velocity costmap is a first velocity costmap generated based on a first version of the source image. The processor generates a second velocity costmap based on a second version of the source image having a higher resolution than the first version of the source image.

Example 3 includes the subject matter of Example 3, wherein the processor is to combine the second velocity costmap with the first velocity costmap.

Example 4 includes the subject matter of Example 3, and further includes a motion analyzer to generate a first three-dimensional motion field based on the first version of the source image and a second three-dimensional motion field based on the second version of the source image. The velocity information in the first and second velocity costmaps is based on the respective first and second three-dimensional motion fields.

Example 5 includes the subject matter of Example 3, and further includes a motion region identifier to identify regions of motion in the first velocity costmap. The second velocity costmap is limited to portions of the second version of the source image corresponding to the identified regions of motion in the first velocity costmap.

Example 6 includes the subject matter of Example 6, wherein the motion region identifier identifies the regions of motion by: dividing the velocity costmap into multiple blocks, each block including multiple cells of the velocity costmap, and grouping adjacent blocks into clusters based on the velocity information and depth information associated with the cells in the adjacent blocks.

Example 7 includes the subject matter of Example 7, wherein the motion region identifier is to group the adjacent blocks into clusters based on a mean shift analysis of the velocity information and the depth information.

Example 8 includes the subject matter of any one of Examples 1-7, and further includes an image resolution adjuster to reduce a resolution of the source image to a coarse image, the velocity costmap generated based on the coarse image.

Example 9 includes the subject matter of any one of Examples 1-7, wherein the velocity costmap is two-dimensional.

Example 10 includes the subject matter of any one of Examples 1-7, wherein the velocity costmap is three-dimensional.

Example 11 includes the subject matter of any one of Examples 1-7, wherein the sensor is a red-green-blue-depth (RGB-D) camera.

Example 12 is a non-transitory computer readable medium comprising instructions that, when executed, cause a robot to at least: capture a source image of an environment in which the robot is located, and generate a velocity costmap associated with the environment based on the source image. The velocity costmap includes velocity information indicative of movement of an obstacle detected in the environment.

Example 13 includes the subject matter of Example 12, wherein the velocity costmap is a first velocity costmap generated based on a first version of the source image. The instructions further cause the robot to generate a second velocity costmap based on a second version of the source image having a higher resolution than the first version of the source image.

Example 14 includes the subject matter of Example 13, wherein the second velocity costmap is combined with the first velocity costmap.

Example 15 includes the subject matter of Example 13, wherein the instructions further cause the robot to generate a first three-dimensional motion field based on the first version of the source image and a second three-dimensional motion field based on the second version of the source image. The velocity information in the first and second velocity costmaps is based on the respective first and second three-dimensional motion fields.

Example 16 includes the subject matter of Example 13, wherein the instructions further cause the robot to identify regions of motion in the first velocity costmap. The second velocity costmap is limited to portions of the second version of the source image corresponding to the identified regions of motion in the first velocity costmap.

Example 17 includes the subject matter of Example 16, wherein the instructions further cause the robot to: divide the velocity costmap into multiple blocks, each block including multiple cells of the velocity costmap, and group adjacent blocks into clusters based on the velocity information and depth information associated with the cells in the adjacent blocks.

Example 18 includes the subject matter of Example 17, wherein the instructions further cause the robot to group the adjacent blocks into clusters based on a mean shift analysis of the velocity information and the depth information.

Example 19 includes the subject matter of any one of Examples 12-18, wherein the instructions further cause the robot to reduce a resolution of the source image to a coarse image, the velocity costmap generated based on the coarse image.

Example 20 includes the subject matter of any one of Examples 12-18, wherein the velocity costmap is two-dimensional.

Example 21 includes the subject matter of any one of Examples 12-18, wherein the velocity costmap is three-dimensional.

Example 22 is a method that includes capturing a source image with a sensor. The source image includes image data indicative of an environment and an obstacle in the environment. The method further includes generating, by executing an instruction with at least one processor, a velocity costmap associated with the environment based on the source image. The velocity costmap includes velocity information indicative of movement of the obstacle detected in the environment.

Example 23 includes the subject matter of Example 22, wherein the velocity costmap is a first velocity costmap generated based on a first version of the source image. The method further includes generating a second velocity costmap based on a second version of the source image having a higher resolution than the first version of the source image.

Example 24 includes the subject matter of Example 23, and further includes combining the second velocity costmap with the first velocity costmap.

Example 25 includes the subject matter of Example 23, further including: generating a first three-dimensional motion field based on the first version of the source image, and generating a second three-dimensional motion field based on the second version of the source image, the velocity information in the first and second velocity costmaps based on the respective first and second three-dimensional motion fields.

Example 26 includes the subject matter of Example 23, and further includes identifying regions of motion in the first velocity costmap. The second velocity costmap limited to portions of the second version of the source image corresponding to the identified regions of motion in the first velocity costmap.

Example 27 includes the subject matter of Example 26, further including: dividing the velocity costmap into multiple blocks, each block including multiple cells of the velocity costmap, and grouping adjacent blocks into clusters based on the velocity information and depth information associated with the cells in the adjacent blocks.

Example 28 includes the subject matter of Example 27, and further includes grouping the adjacent blocks into clusters based on a mean shift analysis of the velocity information and the depth information.

Example 29 includes the subject matter of any one of Examples 22-28, and further includes reducing a resolution of the source image to a coarse image. The velocity costmap is generated based on the coarse image.

Example 30 includes the subject matter of any one of Examples 22-28, wherein the velocity costmap is two-dimensional.

Example 31 includes the subject matter of any one of Examples 22-28, wherein the velocity costmap is three-dimensional.

Example 32 includes the subject matter of Example 22, wherein the sensor is a red-green-blue-depth (RGB-D) camera.

Example 33 is an apparatus that includes means for capturing a source image of an environment. The apparatus further includes means for generating a velocity costmap associated with the environment based the source image. The velocity costmap includes velocity information indicative of movement of an obstacle detected in the environment.

Example 34 includes the subject matter of Example 33, wherein the velocity costmap is a first velocity costmap generated based on a first version of the source image. The means for generating the velocity costmap is to generate a second velocity costmap based on a second version of the source image having a higher resolution than the first version of the source image.

Example 35 includes the subject matter of Example 3345, and further includes means for combining the second velocity costmap with the first velocity costmap.

Example 36 includes the subject matter of Example 34, and further includes means for generating a first three-dimensional motion field based on the first version of the source image and for generating a second three-dimensional motion field based on the second version of the source image. The velocity information in the first and second velocity costmaps is based on the respective first and second three-dimensional motion fields.

Example 37 includes the subject matter of Example 34, and further includes means for identifying regions of motion in the first velocity costmap. The second velocity costmap is limited to portions of the second version of the source image corresponding to the identified regions of motion in the first velocity costmap.

Example 38 includes the subject matter of Example 37, wherein the means for identifying regions of motion in the first velocity costmap includes: means for dividing the velocity costmap into multiple blocks, each block including multiple cells of the velocity costmap, and means for grouping adjacent blocks into clusters based on the velocity information and depth information associated with the cells in the adjacent blocks.

Example 39 includes the subject matter of Example 38, and further includes means for grouping the adjacent blocks into clusters based on a mean shift analysis of the velocity information and the depth information.

Example 40 includes the subject matter of any one of Examples 33-38, and further includes means for reducing a resolution of the source image to a coarse image. The velocity costmap is generated based on the coarse image.

Example 41 includes the subject matter of any one of Examples 33-38, wherein the velocity costmap is two-dimensional.

Example 42 includes the subject matter of any one of Examples 33-38, wherein the velocity costmap is three-dimensional.

Example 43 includes the subject matter of any one of Examples 33-38, wherein the means for capturing is a red-green-blue-depth (RGB-D) camera.

Example 44 is an apparatus that includes hardware processing logic to analyze a source image of an environment in which a robot is located. The source image captured by a sensor on the robot. The hardware processing logic is also to generate a velocity costmap associated with the environment based on the source image. The velocity costmap includes velocity information indicative of movement of an obstacle detected in the environment.

Example 45 includes the subject matter of claim 44, wherein the velocity costmap is a first velocity costmap generated based on a first version of the source image. The hardware processing logic is to generate a second velocity costmap based on a second version of the source image having a higher resolution than the first version of the source image.

Example 46 includes the subject matter of claim 45, wherein the second velocity costmap is combined with the first velocity costmap.

Example 47 includes the subject matter of claim 45, wherein the hardware processing logic is to generate a first three-dimensional motion field based on the first version of the source image and a second three-dimensional motion field based on the second version of the source image. The velocity information in the first and second velocity costmaps is based on the respective first and second three-dimensional motion fields.

Example 48 includes the subject matter of claim 45, wherein the hardware processing logic is to identify regions of motion in the first velocity costmap. The second velocity costmap is limited to portions of the second version of the source image corresponding to the identified regions of motion in the first velocity costmap.

Example 49 includes the subject matter of claim 48, wherein the hardware processing logic is to divide the velocity costmap into multiple blocks. Each block includes multiple cells of the velocity costmap. The hardware processing logic is to group adjacent blocks into clusters based on the velocity information and depth information associated with the cells in the adjacent blocks.

Example 50 includes the subject matter of claim 49, wherein the hardware processing logic is to group the adjacent blocks into clusters based on a mean shift analysis of the velocity information and the depth information.

Example 51 includes the subject matter of any one of claims 44-49, wherein the hardware processing logic is to reduce a resolution of the source image to a coarse image. The velocity costmap is generated based on the coarse image.

Example 52 includes the subject matter of any one of claims 44-49, wherein the velocity costmap is two-dimensional.

Example 53 includes the subject matter of any one of claims 44-49, wherein the velocity costmap is three-dimensional.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An autonomous robot comprising:
a sensor;
memory including machine readable instructions; and
at least one processor to execute the instructions to generate a velocity costmap associated with an environment in which the robot is located, the processor to generate the velocity costmap based on a source image captured by the sensor, the velocity costmap including velocity information indicative of movement of an obstacle detected in the environment, the generated velocity costmap corresponding to a combination of a first velocity costmap and a second velocity costmap different than the first velocity costmap, the first velocity costmap based on a first version of the source image, the second velocity costmap based on a second version of the source image, the second version different than the first version.

2. The autonomous robot as defined in claim 1, wherein the the first version of the source image has a first resolution, the second version of the source image having a second resolution, the second resolution higher than the first resolution.

3. The autonomous robot as defined in claim 2, further including a motion analyzer to generate a first three-dimensional motion field based on the first version of the source image and a second three-dimensional motion field based on the second version of the source image, the velocity information in the first and second velocity costmaps based on the respective first and second three-dimensional motion fields.

4. The autonomous robot as defined in claim 2, further including a motion region identifier to identify regions of motion in the first velocity costmap, the second velocity costmap limited to portions of the second version of the source image corresponding to the identified regions of motion of the first velocity costmap.

5. The autonomous robot as defined in claim 4, wherein the motion region identifier identifies the regions of motion by:
dividing the velocity costmap into multiple blocks, eac block including multiple cells of the velocity costmap; and
grouping adjacent blocks into clusters based on the velocity information and depth information associated with the cells in the adjacent blocks.

6. The autonomous robot as defined in claim 5, wherein the motion region identifier identifier is to group the adjacent blocks into clusters based on a mean shift analysis of the velocity information and the depth information.

7. The autonomous robot as defined in claim 1, further including an image resolution adjuster to reduce a resolution of the source image to a coarse image, the first version of the source image corresponding to the coarse image.

8. The autonomous robot as defined in claim 1, wherein the velocity costmap is two-dimensional.

9. The autonomous robot as defined in claim 1, wherein the velocity costmap is three-dimensional.

10. The autonomous robot as defined in claim 1, wherein the sensor is a red-green-blue-depth (RGB-D) camera.

11. A non-transitory computer readable medium comprising instructions that, when executed, cause a robot to at least:
capture a source image of an environment in which the robot is located; and
generate a velocity costmap associated with the environment based on the source image, the velocity costmap including velocity information indicative of movement of an obstacle detected in the environment, the generated velocity costmap corresponding to a combination of a first velocity costmap and a second velocity costmap different than the first velocity costmap, the first velocity costmap based on a first version of the source image, the second velocity costmap based on a second version of the source image, the second version different than the first version.

12. The non-transitory computer readable medium as defined in claim 11, wherein the first version of the source image has a first resolution, the second version of the source image having a second resolution, the second resolution higher than the first resolution.

13. The non-transitory computer readable medium as defined in claim 12, wherein the instructions further cause the robot to identify regions of motion in the first velocity costmap, the second velocity costmap limited to portions of the second version of the source image corresponding to the identified regions of motion in the first velocity costmap.

14. The non-transitory computer readable medium as defined in claim 13, wherein the instructions further cause the robot to:
divide the velocity costmap into multiple blocks, each block including multiple cells of the velocity costmap; and group adjacent blocks into clusters based on the velocity information and depth information associated with the cells in the adjacent blocks.

15. A method comprising:
capturing a source image with a sensor, the source image including image data indicative of an environment and an obstacle in the environment; and
generating, by executing an instruction with at least one processor, a velocity costmap associated with the environment based on the source image, the velocity costmap including velocity information indicative of movement of the obstacle detected in the environment, the generated velocity costmap corresponding to a combination of a first velocity costmap and a second velocity costmap different than the first velocity costmap, the first velocity costmap based on a first version of the source image, the second velocity costmap based on a second version of the source image, the second version different than the first version.

16. The method as defined in claim 15, wherein the first version of the source image has a first resolution, the second version of the source image having a second resolution, the second resolution higher than the first resolution.

17. The method as defined in claim 16, further including identifying regions of motion in the first velocity costmap, the second velocity costmap limited to portions of the second version of the source image corresponding to the identified regions of motion in the first velocity costmap.

18. The method as defined in claim 17, further including:
dividing the velocity costmap into multiple blocks, each block including multiple cells of the velocity costmap; and
grouping adjacent blocks into clusters based on the velocity information and depth information associated with the cells in the adjacent blocks.

19. An apparatus comprising:
means for capturing a source image of an environment; and
means for generating a velocity costmap associated with the environment based the source image, the velocity costmap including velocity information indicative of movement of an obstacle detected in the environment, the generated velocity costmap corresponding to a combination of a first velocity costmap and a second velocity costmap different than the first velocity costmap, the first velocity costmap based on a first version of the source image, the second velocity costmap based on a second version of the source image, the second version different than the first version.

20. The apparatus as defined in claim 19, wherein the first version of the source image has a first resolution, the second version of the source image having a second resolution, the second resolution higher than the first resolution.

21. The apparatus as defined in claim 20, further including means for identifying regions of motion in the first velocity costmap, the second velocity costmap limited to portions of the second version of the source image corresponding to the identified regions of motion in the first velocity costmap.

22. The apparatus as defined in claim 21, wherein the means for identifying regions of motion in the first velocity costmap includes:
means for dividing the velocity costmap into multiple blocks, each block including multiple cells of the velocity costmap; and
means for grouping adjacent blocks into clusters based on the velocity information and depth information associated with the cells in the adjacent blocks.

23. The apparatus as defined in claim 19, further including means for reducing a resolution of the source image to a coarse image, the velocity costmap generated based on the coarse image.

* * * * *

UNITED STATES PATENT AND TRADEMARK OFFICE
CERTIFICATE OF CORRECTION

| | |
|---|---|
| PATENT NO. | : 11,334,086 B2 |
| APPLICATION NO. | : 16/639702 |
| DATED | : May 17, 2022 |
| INVENTOR(S) | : Wang et al. |

It is certified that error appears in the above-identified patent and that said Letters Patent is hereby corrected as shown below:

In the Claims

Column 19 In Claim 2, Line 60, delete "the the first" and insert -- the first --.

Signed and Sealed this
Twenty-eighth Day of February, 2023

*Katherine Kelly Vidal*

Katherine Kelly Vidal
*Director of the United States Patent and Trademark Office*